(12) United States Patent
Chandrasekaran et al.

(10) Patent No.: US 10,867,334 B2
(45) Date of Patent: Dec. 15, 2020

(54) METHODS, NON-TRANSITORY COMPUTER READABLE STORAGE MEDIUM, AND SYSTEMS FOR ORDER MANAGEMENT AND PROCESSING USING A DISTRIBUTED COMMERCE PLATFORM

(71) Applicant: Stripe Inc., San Francisco, CA (US)

(72) Inventors: Siddarth Chandrasekaran, San Francisco, CA (US); John Brochan Collison, San Francisco, CA (US); Cristina Joelle Cordova, San Francisco, CA (US); James William Danz, Los Altos, CA (US); Stanislas Vincent Francois Polu, San Francisco, CA (US); Devesh Senapati, San Francisco, CA (US)

(73) Assignee: STRIPE, INC., San Francisco, CA (US)

( * ) Notice: Subject to any disclaimer, the term of this patent is extended or adjusted under 35 U.S.C. 154(b) by 513 days.

(21) Appl. No.: 14/824,990

(22) Filed: Aug. 12, 2015

(65) Prior Publication Data
US 2017/0046759 A1 Feb. 16, 2017

(51) Int. Cl.
*G06Q 30/00* (2012.01)
*G06Q 30/06* (2012.01)
(Continued)

(52) U.S. Cl.
CPC ......... *G06Q 30/0623* (2013.01); *G06Q 20/02* (2013.01); *G06Q 20/12* (2013.01); *G06Q 30/0635* (2013.01)

(58) Field of Classification Search
CPC ............. G06Q 30/0601–0645; G06Q 30/0623
(Continued)

(56) References Cited

U.S. PATENT DOCUMENTS 7,222,087 B1 5/2007 Bezos et al.
7,881,987 B1 2/2011 Hart et al.
(Continued)

OTHER PUBLICATIONS

Cretu, L. (2012). Smart cities design using event-driven paradigm and semantic web. Informatica Economica, 16(4), 57-67. Retrieved from https://search.proquest.conn/docview/1399058573?accountid=14753 (Year: 2012).*
(Continued)

*Primary Examiner* — Brittney N Miller
*Assistant Examiner* — Arielle E Weiner
(74) *Attorney, Agent, or Firm* — Womble Bond Dickinson (US) LLP

(57) ABSTRACT

In embodiments, methods and systems for order management and processing based on a distributed commerce platform are provided. A distributed commerce platform supports end-to-end integrated product publication, order-management and payment services. In particular, the distributed commerce platform supports components based on Application Programming Interfaces (API) that standardize the implementation of a distributed commerce solution or configuration of off-site buying experiences. Using the distributed commerce platform, merchants can concurrently offer, sell, and process orders for products through a plurality of different affiliate channels. The distributed commerce platform can also be implemented as a federated portal from which a merchant can identify affiliate channels to publish product objects, access the plurality of affiliate channels and define configurations for processing objects of the merchant's distributed commerce solution. The configurations can be accessed during a purchase flow such that orders from a channel are processed based on the specific attributes identified in the configurations.

15 Claims, 11 Drawing Sheets

(51) Int. Cl.
*G06Q 20/12* (2012.01)
*G06Q 20/02* (2012.01)

(58) Field of Classification Search
USPC .................................. 705/26.1–27.2, 26.61
See application file for complete search history.

(56) References Cited

U.S. PATENT DOCUMENTS

| | | | |
|---|---|---|---|
| 8,243,893 B2 | 8/2012 | Hayes et al. | |
| 8,341,036 B2 | 12/2012 | Hartman et al. | |
| 8,606,639 B1 | 12/2013 | Sun et al. | |
| 8,805,573 B2 | 8/2014 | Brunner et al. | |
| 8,938,396 B2 | 1/2015 | Swafford et al. | |
| 9,020,847 B2 | 4/2015 | Ishii | |
| 9,754,245 B1* | 9/2017 | Davison | G06Q 20/12 |
| 2009/0254450 A1* | 10/2009 | Bollay | G06Q 30/06 |
| | | | 705/26.1 |
| 2010/0183125 A1* | 7/2010 | Hayes, Jr. | G06Q 10/10 |
| | | | 379/88.01 |
| 2011/0307389 A1* | 12/2011 | Francia | G06Q 20/12 |
| | | | 705/67 |
| 2012/0246073 A1* | 9/2012 | Gore | G06Q 20/12 |
| | | | 705/44 |
| 2012/0303493 A1* | 11/2012 | Ishii | G06Q 10/08 |
| | | | 705/28 |
| 2013/0253960 A1 | 9/2013 | Blom et al. | |
| 2013/0253980 A1* | 9/2013 | Blom | G06Q 30/0251 |
| | | | 705/7.29 |
| 2014/0052617 A1* | 2/2014 | Chawla | G06Q 20/12 |
| | | | 705/39 |
| 2014/0214588 A1* | 7/2014 | Verchere | G06Q 10/087 |
| | | | 705/26.5 |
| 2014/0280546 A1* | 9/2014 | King | H04L 51/24 |
| | | | 709/204 |
| 2015/0106263 A1 | 4/2015 | Linden et al. | |
| 2015/0178767 A1 | 6/2015 | Yoo et al. | |
| 2015/0178768 A1 | 6/2015 | Yoo et al. | |
| 2016/0358174 A1* | 12/2016 | Kassemi | H04L 67/02 |

OTHER PUBLICATIONS

Notification of Transmittal of the International Search Report and the Written Opinion of the International Searching Authority issued for International Patent Application No. PCT/US2016/43931, dated Oct. 5, 2016.
International Preliminary Report on Patentability received for PCT Patent Application No. PCT/US2016/043931, dated Feb. 22, 2018, 10 pages.

* cited by examiner

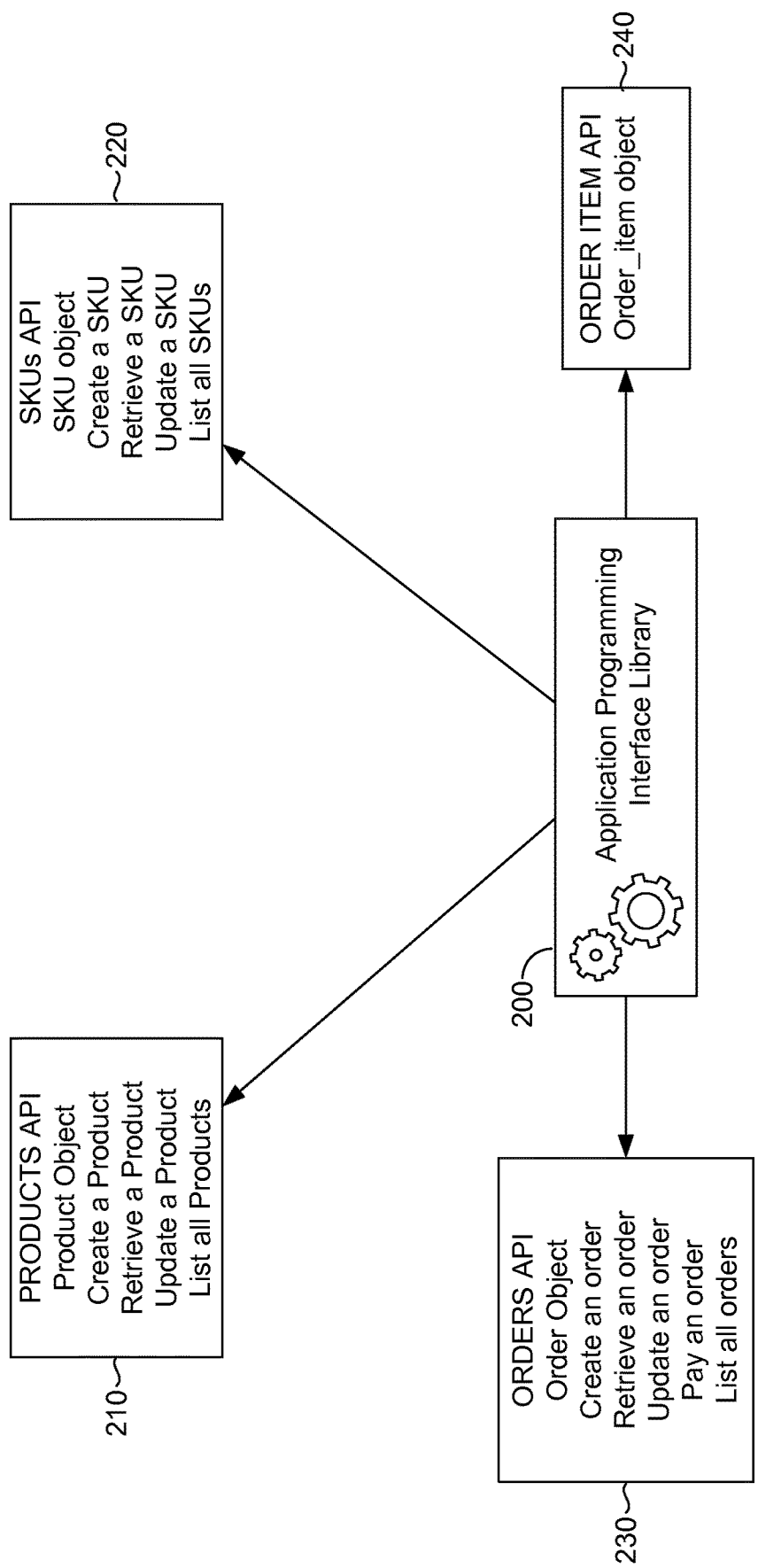

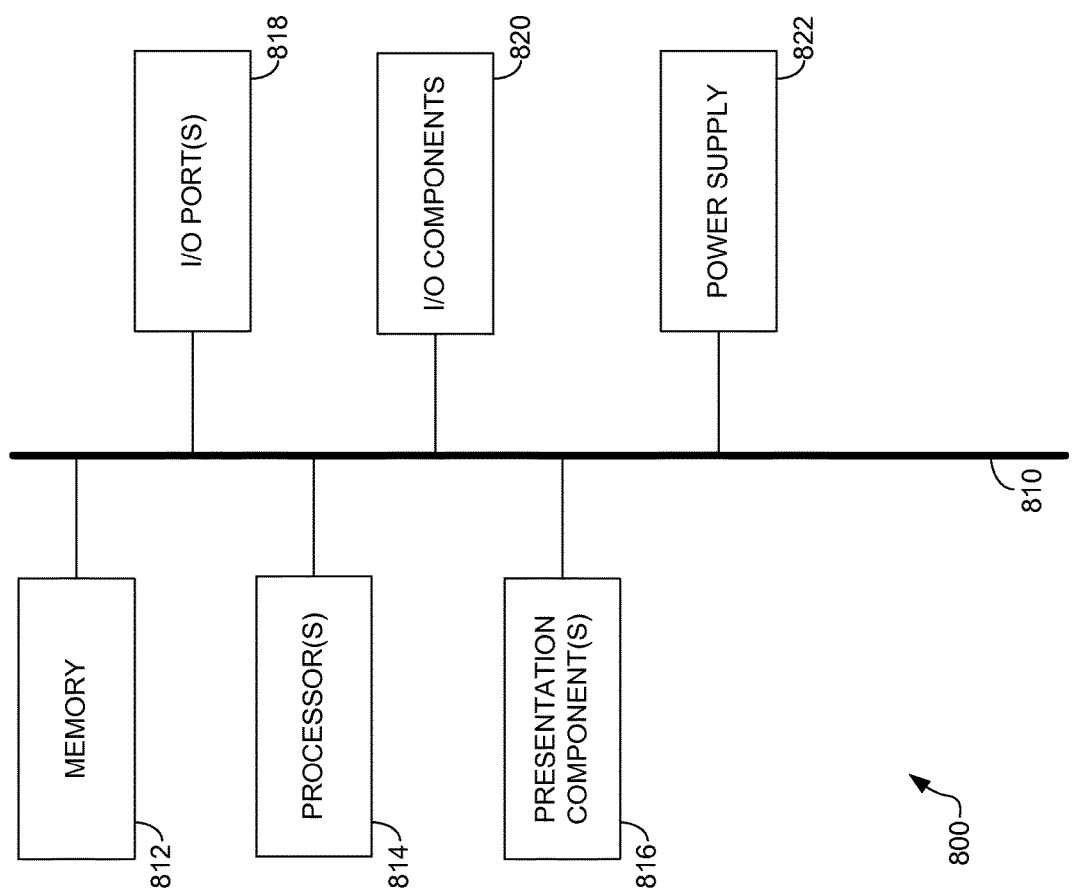

US 10,867,334 B2

METHODS, NON-TRANSITORY COMPUTER READABLE STORAGE MEDIUM, AND SYSTEMS FOR ORDER MANAGEMENT AND PROCESSING USING A DISTRIBUTED COMMERCE PLATFORM

BACKGROUND

E-commerce merchants are increasingly adopting distributed commerce solutions or off-site buying experiences to sell their products. Merchants support distributed commerce solutions, such as affiliate channels built on websites and mobile applications, where the merchant is not the entity directly presenting the product. The affiliate channels (e.g., advertising, cataloguing, mobile marketplaces, or social and messaging channels) support the discovery and selection of different types of products and can generate revenue for themselves from their affiliation with the merchant without any investment in the product inventory. Merchants have several options when selecting affiliate channels, where affiliates support different types of website services (e.g., social networks, tweets, posts, and pins) and mobile applications (e.g., fashion discovery engines, blogs, and product aggregators).

Today, merchants have to customize their distributed commerce solution independently for the features of each affiliate channel, often with results that negatively impact at least one of: the buyer, the affiliate, or the merchant. For example, purchasing a product may be accomplished by redirecting the buyer away from the affiliate website or mobile application to the merchant's website. However, conversion rates for purchases in these scenarios have been poor because of the additional burden on the buyer to enter their information to make purchases for each new merchant. In addition, certain affiliates are interested in keeping visitor traffic on their websites or mobile applications and expect their advertising units to be actual buying experiences where the buyer remains on the website. As such, merchants are faced with the challenge of integrating their distributed commerce solutions in such a way that the off-site e-commerce experience for buyers, affiliates, and merchants themselves is customary and straightforward.

SUMMARY

Embodiments described herein provide methods and systems for order management and processing based on a distributed commerce platform. A distributed commerce platform supports end-to-end integrated product publication, order-management and payment services based on APIs of the distributed commerce platform. In particular, the platform supports components that standardize the implementation of a distributed commerce solution and/or configuration of off-site buying experiences. Using the distributed commerce platform, merchants can offer, sell, and process orders for products through a plurality of different channels.

With reference to FIG. 1A, at a high level, a hosting entity 110 implements the distributed commerce platform ("platform") to support product publication, order management and payment for merchants selling their products through different affiliate channels. Based on an Application Programming Interface (API) that creates a standardized service interface to facilitate communication between disparate merchants and channels, a merchant 130 creates a product object 160 that is published to the host entity 110 platform. The merchant 130 creates the product object 160 having one or more stock keeping unit (SKU) objects that identify a specific product SKUs in an inventory of the merchant. A merchant that sells products can also be represented or supported by a third-party that communicates with the host entity on behalf of the merchant. In this regard, a merchant can provide a third-party platform access to their inventory such that the third-party entity facilitates creating product objects for the inventory that is communicated to the host entity 110. The host entity 110 platform provides an interface for the merchant to identify which channels (e.g., channel 150) the merchant wants the product object to be distributed to, and the product object 162 is published to those channels. At the channel 150, a buyer can view and select a product to purchase, where the product is published at the channel 150 based on the product object 162. The channel 150 generates an order object 170 for an order when the buyer selects a product to be purchased. The channel 150 communicates the order object 170 to the host entity 110 where the order is processed based on the order object 170. Processing the order can include referencing the merchant's configuration on how to process specific attributes (e.g., shipping and tax) for orders from the channel. Order processing can include communicating the order object 172 to the merchant's systems (e.g., internal order management systems) to update the order object attributes. An updated order object (e.g., updated order object 180) can be generated after initial processing of the order. The host entity communicates the updated order object 182 to the channel and the updated order is displayed via the channel to the buyer in order to receive payment. Upon receiving payment information from the buyer, the channel generates a payment object 190 that is communicated to the host entity to process payment.

The host entity supports several different payment schemes and corresponding payment systems of the schemes. In particular, the product object includes attributes to support characteristics of the different payment schemes. By way of example, the host entity can support (1) a host entity payment scheme, where the host entity is selected for processing payment; (2) a merchant payment scheme, where the merchant's system is selected for processing payment; and (3) a third-party processor payment scheme, where a third-party process of the merchant is selected for processing payment. Payment systems can also vary where merchants support multiple checkout methods or payment processor back-ends based on supported payment types (e.g., credit cards, online-based payment systems and other specialized checkout payment types). As such, variations and combinations of payment schemes and payment systems are contemplated with embodiments described herein. In this regard, the payment systems (e.g., host entity payment processor, merchant payment processor, or third-party payment processors) can receive and process payments based on the payment object that is configured with attributes that facilitate processing different types of payment schemes.

In operation, several components can be implemented to support the order management and processing functionality described herein. A product publication component can support a flexible product schema that is configured based on the product attributes. As such, a merchant can publish structured product data to display to buyers across a plurality of channels. An order-management component can support receiving orders and initiating order fulfillment from the plurality of channels to existing merchants' internal order management systems. A payment component can support a plurality of payment schemes and corresponding systems for charging buyers for the products. The publishing component, the order-management component and the payment component are integrated and facilitate standardized communications between systems to support a plurality of different types of channels, merchants and products. The distributed commerce platform can also implement a federated portal from which a merchant can identify affiliate channels to publish product objects, access the plurality of affiliate channels, and define configurations for processing objects of the merchant's distributed commerce solution. The configurations can be accessed during a purchase flow, such that, orders from a channel are processed based on the configurations. Information from the merchant's platform and systems can also be retrieved as defined in the configuration on the distributed commerce platform.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present invention is described in detail below with reference to the attached drawing figures, wherein:

FIG. 2 is a schematic of an exemplary application programming interface (API) library, in accordance with embodiments described herein;

FIG. 8 is a block diagram of an exemplary computing environment suitable for use in implementing embodiments described herein.

DETAILED DESCRIPTION

Figure 1A:
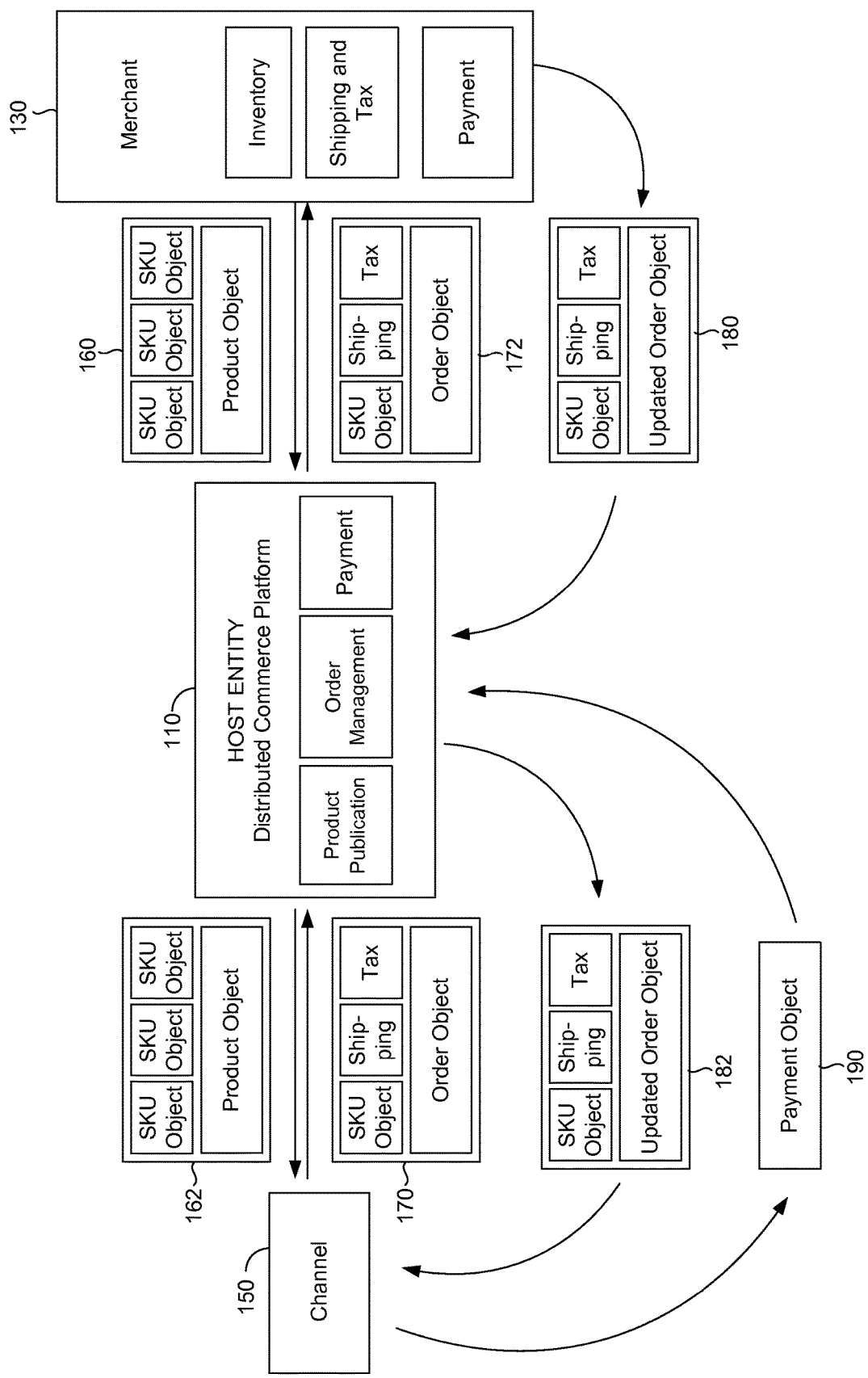
FIGS. 1A-1B are block diagrams of exemplary operating environments in which embodiments described herein may be employed.

As merchants continue to use distributed commerce solutions or off-site buying experiences to sell their products, they are facing new challenges with conventional systems and tools that limit their ability to provide customary and straightforward market experiences for buyers, affiliates, and merchants themselves. These affiliate channels ("affiliates") built on websites and mobile applications can be advertising, cataloguing, mobile marketplaces, and social and messaging channels that operate different services that can be used with e-commerce platforms to sell products. These endpoints of technology serve as discovery and selection marketplaces for different types of products and merchants.

However, conventional systems and tools specifically do not address problems related to publishing product data, receiving and processing orders, and processing payments from buyers. In particular, support for a group of merchants seamlessly communicating product and order information concurrently with several third-party channels is missing in these systems. For example, merchants cannot adequately and dependably present product data on a plurality of channels because no real-time visibility exists of their inventory levels for their affiliate channels. Further, after an order is taken at an affiliate channel, processing the order using the merchant's own system can be complex without adequate integration between the merchant system and the affiliate channel. Also, payment interfaces to charge buyers usually drives visitor traffic away from the affiliate website or mobile application to the merchant site, sometimes to the dissatisfaction of the affiliates and buyers alike, and even reducing the possibility of sale for the merchant. Moreover, integrating a merchant's system to an affiliate channel is usually done on a one-off basis, which can be resource-intensive and expensive when a merchant is connected with several different affiliate channels. As such, conventional systems and tools provide limited off-site buying experiences that usually include independent and laborious integration of the merchant's off-site buying solution to each possible affiliate channel.

Embodiments of the present invention provide simple and efficient methods and systems for order management and processing using a distributed commerce platform. A distributed commerce platform supports end-to-end integrated product publication, order-management, and payment services. The distributed commerce channel can support different types of affiliate channels (e.g., advertising, cataloguing, mobile marketplaces, and social and messaging channels), and specifically integrate to the specific web services (e.g., tweets, pins, post, messages) and mobile applications (e.g., fashion discovery engines, blogs, and product aggregators) supported at each type of channel. Integrating the APIs into different channels can be performed in several different ways. By way of example, the APIs can facilitate standardized communication of products, SKUs, and orders through interfaces supported using protocol-based (e.g., Hypertext Transfer Protocol) messaging having defined structures for request and response messages. In this regard, a wide range of common computing functions can be written based on the APIs, such that, the functionality defined herein can be performed on many different channels. For example, a web link or a call to an API feed defined based on the APIs can operate on different websites and mobile applications. Other variations and combinations of integration mechanisms and protocols for communication are contemplated with embodiments of described herein. The distributed commerce channel can also be extended to other types of affiliate programs (e.g., travel agencies, event ticketing, and tour operators) that traditionally lacked full integration with merchant systems, such that, product data, order-management and payment, can be available and performed from the affiliate site to provide resourceful and improved off-site marketplace experiences for buyers, affiliates, and merchants.

The distributed commerce platform supports a unified end-to-end marketplace based on components and services on channel devices, distributed commerce platform devices, and merchant devices. In particular, a product publication component can support a flexible product schema that is configured based on product attributes, such that, a merchant can publish structured product data to display to buyers across a plurality of channels. The distributed commerce platform can abstract different products and SKUs to generate standardized objects that facilitate the communication and display of the products and SKUs on a channel. The distributed commerce platform may also update inventory levels for a corresponding merchant inventory system based on orders processed using the abstractions of the products and SKUs displayed via a channel. It is contemplated that, the merchant may publish product data that corresponds in real-time to inventory levels at the merchant's inventory system. The end-to-end integration of the plurality of channels with the merchant's own system via the distributed commerce platform facilitates messaging between an off-site buying experience and merchant systems. An order-management component can support receiving order data and initiating order fulfillment from the plurality of channels to existing merchants' internal order management systems. For example, when a buyer hits a "buy" button, order processing can be fully integrated based on immediate accessibility to information from the buyer and accessibility to merchant systems based on the distributed commerce platform. A payment component can support a native payment system of the distributed commerce platform and non-native payment systems for charging buyers for the products. In this regard, a merchant can simply rely on the native payment system for a checkout flow or process payment through the distributed commerce platform using a supported non-native payment system on the merchant's platform. The distributed commerce platform can also implement a federated portal from which a merchant can identify affiliate channels to publish product objects, access the plurality of affiliate channels and define configurations for order management and processing based on the merchant's distributed commerce solution. During a purchase flow, configurations can be accessed, such that, order attributes (e.g., shipping, tax, SKUs) in an order from a channel are processed based on configurations. For example, a configuration can include a configuration for payment, where the configuration identifies one or more payment schemes corresponding to affiliates, orders, and systems associated with the merchant. Another configuration can be a shipping and tax configuration that indicates to the distributed commerce platform to utilize a third-party provider for shipping and tax. In this regard, information from a third-party data provider can be retrieved to process the order.

The distributed commerce platform as used herein can comprise integrated components (e.g., a publication component, an order-management component, and a payment component) that facilitate standardized communications between systems for a plurality of different types of channels, merchants and products. The integrated components refer to the hardware architecture and/or software framework that support distributed commerce functionality using the distributed commerce platform. The hardware architecture refers to physical components and interrelationships thereof and the software framework refers to software providing functionality that can be implemented with hardware operated on a device or server. Specifically, the hardware architecture may be generic to simplify the functionality described herein using the software framework of the distributed commerce platform. The end-to-end software-based distributed commerce platform can operate with the devices and servers to operate computer hardware to provide distributed commerce functionality. As such, a distributed commerce platform server can manage resources and provide services for the product publication, payment, and order management of off-site buying experiences.

In an exemplary embodiment, the distributed commerce platform comprises an Application Programming Interface (API) library that includes specifications for attributes, arguments, routines, data structures, object classes, and variables may support the interaction the hardware architecture of the device and the software framework of the distributed commerce platform system. The distributed commerce platform APIs can also further identify rules, policies, and logic for delivery of messages between components in the distributed commerce platform. The APIs can include an agreed upon set of behaviors of different components of the distributed commerce platform for providing a unified e-commerce marketplace. APIs can be implemented across devices of a distributed commerce platform system to provide improved distributed commerce solutions and off-site buying experiences. The APIs can also include configuration specifications for the distributed commerce platform. As such, the channel devices, distributed commerce platform devices, and merchant devices can communicate within the unified distributed commerce platform.

In operation, the APIs can facilitate generating objects (e.g., product, order, and payment objects) that can refer to defined characteristics of elements of an off-site buying experience that are based on API abstractions. The objects can be generated based on object attributes and child attributes. The objects and object attributes support functions and function arguments that facilitate integrating and standardizing communications between disparate systems in off-site buying experiences. The objects can be processed at the distributed commerce platform based on specific merchant-defined configurations for the objects. Merchants can log into the distributed commerce platform via a portal interface using federated merchant accounts, where the distributed commerce platform supports viewing, configuring, and communicating information to devices in the distributed commerce platform for processing the objects. In this regard, distributed commerce solutions can be efficiently implemented and managed for buyers, affiliates and merchants.

Figure 1B:
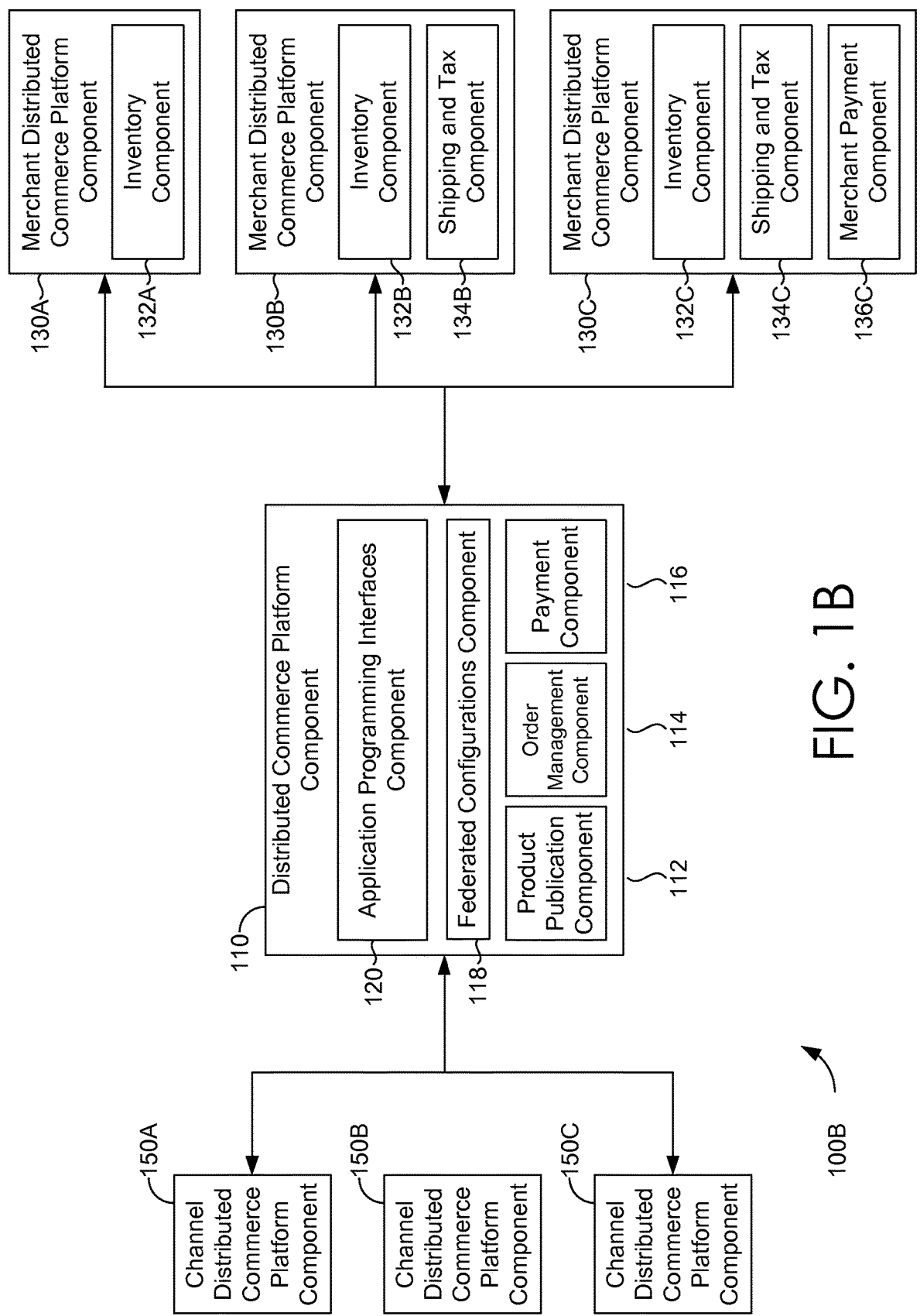

Referring now to FIG. 1B, FIG. 1B illustrates an exemplary distributed commerce platform system 100B in which implementations of the present disclosure may be employed. In particular, FIG. 1B shows a high level architecture of distributed commerce platform system 100B having hardware and software components in accordance with implementations of the present disclosure. The distributed commerce platform system 100B and functionality supported therein can be described by way of an exemplary operating environment having several individual components. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components, the distributed commerce platform system 100B includes a distributed commerce platform component ("platform component") 110, merchant distributed commerce platform components ("merchant component") 130A, 130B and 130C and channel distributed commerce platform components ("channel component") 150A, 150B and 150C. Each of the merchant component, platform component, and channel component can be operated on any type of computing device, which may correspond to computing device 800 described with reference to FIG. 8, for example. The components of the distributed commerce platform system 100B may communicate with each other over a network (not shown), which may include, without limitation, one or more local area networks (LANs) and/or wide area networks (WANs). Any number of nodes (e.g., servers) and client computing devices may be employed within the distributed commerce platform system 100B within the scope of implementations of the present disclosure.

In the distributed commerce platform system 100B, the components support providing distributed commerce solutions or off-site buying experiences. The channel components, the platform components, and merchant components can be implemented to support functionality of the distributed commerce platform. Each channel component, platform component and merchant component may operate an application or service to facilitate providing the functionality described herein. The phrase "application" or "service" as used herein broadly refers to any software, or portions of software, that run on top of, or storage within, platform, merchant, and channel computing devices.

Having described various aspects of the distributed commerce platform system 100B, it is noted that any number of components may be employed to achieve the desired functionality within the scope of the present disclosure. Although the various components may be organized differently; or components may consist of multiple functional components or be combined in a single functional component. Further, although some components of FIGS. 1A and 1B are depicted as single components, the depictions are exemplary in nature and in number and are not to be construed as limiting for all implementations of the present disclosure.

With continued reference to FIG. 1B, FIG. 1B includes the platform component 110 and components supported therein. The platform component 110 and functionality supported therein can be described by way of an exemplary operating environment having several additional components described below. The platform component 110 can include a product publication component 112, an order management component 114, a payment component 116, a federated configurations component 118, and an application programming interfaces component 120. The platform component 110 can communicate with a plurality of merchant components (e.g., 130A, 130B, and 130C) and a plurality channel components (150A, 150B, and 150C) to process objects (e.g., products, orders, and payment objects) and standardize messaging and communications between the disparate systems of the merchants and channels.

Turning to FIG. 2 and Tables 1-4 below, the platform component 110 can also support an Application Programming Interface (API) component 200 that provides an API library that includes APIs for products (Products API 210), SKUs (SKUs API 220), orders (Orders API 230) and order item (Order Item API 240). The products API 210 supports the product object, create a product function, retrieve a product function, update a product function, and list all products function. The product object stores representations of products and can be used in conjunction with SKUs. The product object comprises attributes and the product functions include arguments and child arguments as illustrated in Table 1.

TABLE 1

| PRODUCT API ATTIBUTES/ ARGUMENTS (210) | id; object; livemode; active (Whether or not the product is available for purchase); created; images (A list of URLs of product images); metadata (A set of key/value pairs that can be attached to a product object. It can be used for storing additional information about the product in a structured format); name (The product name displayable to the customer); shippable; skus (A sublist of SJUs associated with the product); updated; attributes (A list of attributes that each SKU can specify); caption; description; package_dimensions; Url; (A Url of a publicly-accessible webpage for this product. |
|---|---|

The SKUs API 220 supports the SKU object, create a SKU function, retrieve a SKU function, update a SKU function, and a list all SKUs function. The SKU object stores representations of stock keeping units. A SKU can describe specific product variations, taking into account combinations of attributes, currency, and cost. The SKU object comprises attributes and the SKU functions include arguments and child arguments as illustrated in Table 2. In operation, the platform component supports the Products API 210 and SKUs APIs to represent a product catalog or product inventory of a merchant. For example, the product object and the SKU object can represent a T-shirt with a specific SKU for a large, red version of the T-shirt.

TABLE 2

| SKU API ATTIBUTES/ ARGUMENTS (220) | id; object; livemode; active (Where or not the SKU is available for purchase); attributes (A dictionary of attributes and values for the attributes defined by the product e.g., ["size", "gender"] a valid SKU includes attributes {"size": "Medium", "gender: " "Unisex"}; created; currency; inventory (Description of SKU's inventory e.g., type, quantity, value: in_stock, limited, scant, out_of_stock"); metadata (A set of key/value pair that can be attached to a SKU object. It can be useful for storing additional information about the SKU in a structured format.); price; product; updated; description (The SKU's description, meant to be displayable to the customer); image; package_dimensions; |
|---|---|

The orders API 230 supports the orders object, create an order function, retrieve an order function, update an order function, pay an order function, and list all orders function. The orders object handles storing information for product purchases. The orders object comprises attributes and the orders functions include arguments and child arguments as illustrated in Table 3.

An order items API 240 supports the order item object that is a representation of the constituent items of any given order. The order items object can be used to represent SKUs, discounts, shipping costs or taxes owed on an order, along with other types of data associated with the order. The order item object comprises attributes as illustrated in Table 4. Other variations and combinations of APIs are contemplated with embodiments described herein.

TABLE 3

| | |
|---|---|
| ORDERS API ATTIBUTES/ ARGUMENTS (230) | id; object; livemode; amount; created; currency; items (list of items constituting the order); parent (ID of the an associated object for line item); quantity (A positive integer representing the number of instance of parent that are included in an order item); status (Current order status); Charge (The ID of the payment used to pay for the order); email (email address of the customer placing the order); shipping (shipping information for order e.g., recipient name, carrier, phone, tracking number); customer (The ID of an existing customer that will be charged in the request); source (A payment source to be charged, such as a credit card); |

TABLE 4

| | |
|---|---|
| ORDER ITEM API - ATTRIBUTES/ ARGUMENTS (240) | object; amount; currency; description (Description of line item meant to be displayable to the user); type (The type of line item. One of: sku, tax, shipping, discount); parent (The ID of the associated object for the line item); quantity (A positive integer represent the number of instance of parent that are include in the order item); |

With reference to FIG. 1B, the platform component 110 further supports a federated configurations component 118 that supports a federated account of a merchant and stores configurations defined by the merchant via the merchant account. Several different types of configurations are contemplated with embodiments described herein. Configurations in the federated configurations component 118 can generally direct the processing of objects. For example, a merchant can define a product configuration for identifying affiliate channels to which a product is published to, an order object attribute configuration for handling shipping, tax, and payment, or a payment configuration for identifying a payment scheme for processing payments from buyers. For example, a merchant can configure shipping and tax preferences in their merchant account, by choosing one of four types: free; flat_rate; provider; and dynamic. The merchant may specify a shipping and/or tax provider that the distributed commerce platform can reach out to in real-time to compute costs. The distributed commerce platform can support a dynamic configuration if the merchant opts to calculate shipping and taxes using their own systems. In this regard, a merchant can provide an endpoint on the merchant platform that the distributed commerce platform component 110 can reach out to in real-time to retrieve these costs.

The federated configuration component 118 can be accessed via a federated portal interface of the platform component 110, such that, a merchant can identify channels for publishing products, access the plurality of channels and define configurations for processing objects. By way of example, the federated configuration component 118 can support configurations comprising webhooks that support notification and providing updates that trigger additional processes. A webhook can specifically refer to a mechanism that is implemented to receive notifications of particular events. Webhooks can be configured via the platform component 100 and supported using the federated configuration component 118. Webhooks can support real-time updates of products and orders. By way of example, webhooks include: product.created: a product is created; product.updated: a product is updated; sku.created: a SKU is created; sku.updates: a SKU is updated (e.g., inventory is decreased after a successful order); order.created: a customer begins the checkout process; order.updated: the details of an order (e.g., shipping) are updated; and order.paid: a customer completes a purchase.

The distributed commerce platform system 100 includes a plurality of merchant components (130A, 130B, and 130C). As shown in FIG. 1B, merchants can implement different types of merchant platforms. A merchant may subscribe to the distributed commerce platform for support of off-site buying experiences on one or more channel components (e.g., 150A, 150B, and 150C) based on the specific needs of the merchant. Merchant subscriptions can be different based on the components of their merchant platforms and the configurations defined in the distributed commerce platform. Merchants can have systems that facilitate providing their products from sites owned and/or operated by the merchant. Merchants can also opt to have their products sold through affiliate channels that present the products on behalf of merchants in off-site buying experiences. The platform component 110 can support merchant components to sell their products through one or more channel components (e.g., 150A, 150B, and 150C). In particular, the platform component 110 is responsible for implementing APIs that support inventory, shipping and tax, and payment based on platform objects (e.g., product, order, and payment objects). The platform component 110 can support objects through integrations between merchant platform components (e.g., inventory, shipping and tax, and payment) and platform components (e.g., product publication component, order management component, and payment component).

As such, merchants can implement different types of e-commerce platform configurations as part of their merchant platform, where the different types of platform configurations are supported concurrently via the platform component 110. Each merchant can implement different variations and combinations of merchant systems within the merchant platform. For example, merchant platform 130A can implement an inventory component 132A, merchant platform 130B can implement an inventory component 132B and a shipping and tax component 134B, and merchant platform 130C can implement an inventory component 132C, a shipping and tax component 134C, and a merchant payment component 136C. In this regard, the platform component can support merchants having different types of configurations of merchant components, where the platform component 110 can internally manage combinations and variations of components the merchants internally or externally integrate with the distributed commerce platform. It is also contemplated that the distributed commerce platform can internally support a merchant inventory platform directly from the platform component 110.

FIG. 1B also illustrates a plurality of channel components (150A, 150B, and 150C). The channel components can each be associated with one or more merchants that have a relationship with an affiliate channel for the affiliate channel to sell the goods on behalf of the merchant. A single affiliate can also implement multiple channels (i.e., advertising, cataloguing, mobile marketplaces, and social and messaging channels). As such, a merchant can contract with a single affiliate to sell the products of the merchant through one or more of the affiliate's channels. It is also contemplated that a merchant can contract with multiple affiliates to sell the products of the merchant through different channels of each of the affiliates in off-site buying experiences. The platform component 110 can support merchant components to sell their products through one or more channel components (e.g., 150A, 150B, and 150C).

With reference to the components identified in FIG. 1B, embodiments of the present disclosure can further be described by way of examples. The distributed commerce platform 100 can be developed based on a plurality of application programming interfaces (APIs) (e.g., API component 120). A merchant today can contract with third-party affiliates, resellers or customer integrations ("affiliates") (e.g., channel platform components) to sell the merchant's products through the affiliate's channels (e.g., advertising, cataloguing, mobile marketplaces, and social and messaging channels). The merchant can contract with one affiliate having several different channels or the merchant can contract with several different affiliates having different channels. A merchant can subscribe to services of the distributed commerce platform and receive access to the plurality of APIs that support off-site buying experiences. The distributed commerce platform can assist the merchant to publish their products through affiliate channels and concurrently accept orders from each of the channels. For example, the merchant can sell products through products defined using the APIs (e.g., product object and SKU object) and embedded into web links available through different types of web services (e.g., tweets, post, and pins). The merchant can identify via the distributed commerce platform 100 which products to publish to particular affiliate channels. Identifying products to publish on particular affiliate channels associates the product with the channels such that the products are enabled to be communicated to the channel for publication to buyers.

By way of example, a "Buy Now" button on an affiliate channel website or mobile application can trigger an interface within the affiliate channel that displays a product and optionally allows a particular SKU to be purchased. A buyer can select a product to purchase indicating intent to purchase the particular SKU or set of SKUs. The order can be created synchronously within the purchase flow, as such, the distributed commerce platform components can support various aspects of the ordering process. For example, the product can be configured with a shipping plan so that shipping costs are automatically added to the cost of the order. In the alternative, the distributed commerce platform can communicate in real-time with a merchant platform for determining shipping and/or tax (e.g., tax automatically added to orders). Upon generating final order details, the full total including shipping cost can be displayed to the buyer, all without having to leave an interface of the channel. The buyer can complete the checkout flow and pay the order. The payment can be processed based on one of a plurality of payment schemes supported by the distributed commerce platform. The distributed commerce platform can support integration with several different payment schemes and corresponding payments systems associated with the payment schemes. In exemplary embodiments, the distributed commerce platform can support (1) a platform payment scheme, where the platform supports processing payment; (2) a merchant platform payment scheme, where the merchant platform support processing payment; and (3) a third-party processor platform payment scheme, where a third-party processor platform associated with the merchant supports processing payment. Other variations and combinations of payment schemes are contemplated with embodiments described herein. The merchant can also define a notification configuration (e.g., webhook) where the merchant platform listens for a notification of a paid order and the merchant platform triggers a processing routine (e.g., handler) that schedules a product for shipping as soon as the order is paid. As such, advantageously, the distributed commerce platform implements a wholly off-site buying experience while fully maintaining integration in the merchant platform. The distributed commerce platform can support a merchant account (e.g., via the federated configuration component 118) to create and manage payment within the distributed commerce platform. The distributed commerce platform can also provide a mechanism for providing details on products for sale and the inventory maintained by the merchant in real-time during a purchase flow.

Figure 3A:
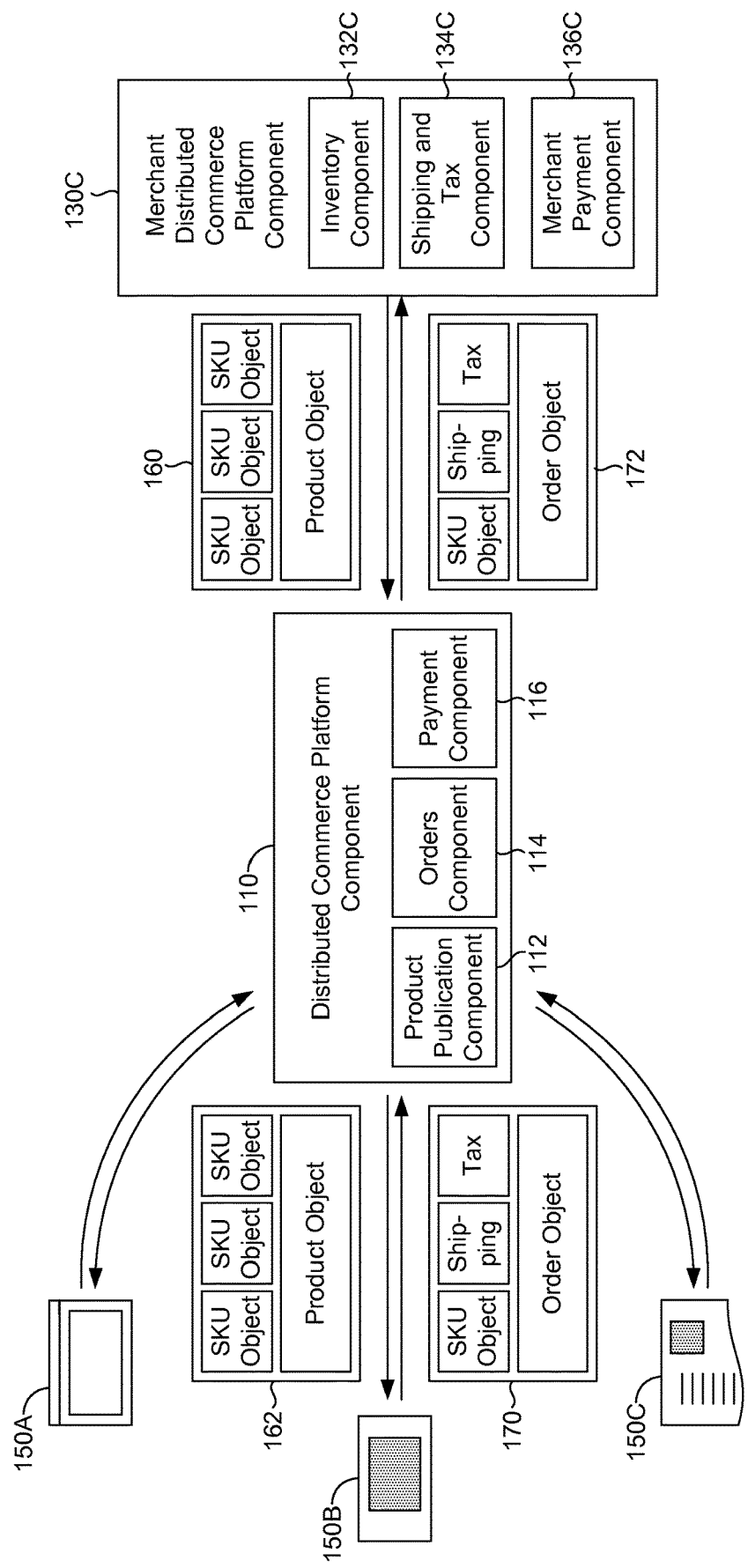
FIGS. 3A-3E are schematics of an exemplary distributed commerce platform system for order management and processing, in accordance with embodiments described herein.

Turning to FIGS. 3A-3E, embodiments described herein can be illustrated based on an exemplary distributed commerce platform implementation having several components illustrated in FIG. 3A. The distributed commerce platform implementation includes a distributed commerce platform component ("platform component") 110 having a product publication component 112, an order component 114, a payment component 114. The distributed commerce platform implementation also include a merchant distributed commerce platform component 130C ("merchant component") having an inventory component 132C, a shipping and tax component 134C, and a merchant payment component 136C. The distributed commerce platform implementation further includes channel distributed commerce platform components (150A, 150B, 150C) corresponding the merchant platform 130C.

The merchant component 130C is configured for facilitating the representation of merchant products for display via one or more channel platforms (e.g., 150A, 150B, and 150C). A product can generally refer to goods or services that a merchant makes available to a buyer. A product can be different types (e.g., physical or digital products) that a merchant offers for display using one or more channels. In this regard, by way of example, products can include physical goods (e.g., clothing, electronics, physical media), non-physical good (e.g., e-books, music, digital media) or services (e.g., finding a matching paint, generating a list of matching doctors, finding goods and services). The merchant platform 130C can represent the products in a structured manner based on APIs that define a schema of the distributed commerce platform. The schema refers to the underlying organizational pattern or structure for representing products within the distributed commerce platform. The schema can include two core objects-a product object and a SKU object.

In operation, the merchant component 130C can receive a selection of a product and facilitate generating a product instance (e.g., product instance 160) that represents the product. The product instance is defined using a product object and a SKU object. The product object captures the particulars and characteristics of a merchant's products based at least in part on the SKU of the product. The SKU object stores the representations of the SKU, where the SKU describes the specific variations, taking into account any combination of attributes, currency, and cost. The product object and the SKU represent a product catalog or product inventory of a merchant. By way of example, a product instance can be generated for a T-shirt or a video game, where the product instance comprises a product object and the SKU object for the T-shirt or video game. The T-shirt can have a SKU that indicates that the T-shirt is a large, red version of the T-shirt and video game can have a SKU that indicates a particular console for the video game and whether it is digital or physical. It is contemplated that the schema is extensible to accommodate customization of the basic structure of the product object or the SKU object. As such, the product object specifics and SKU object specifics can be modified to adequately capture different types of merchant products. The product instance 160 can be communicated to the platform component 110 such that the product publication component 112 communicates the product instance 162 to one or more channel components. In one embodiment, the product publication component 112 can embed the product instance 162 into a web link that is compatible with a web service and interface of each of the plurality of channel components.

A channel component (e.g., 150A, 150B, 150C) is responsible for processing orders received at the channel component. The channel component can receive a selection of a product at an interface supported via a channel component. The channel component can communicate information via a plurality of interfaces operating on end-user devices that a buyer operates when browsing for products to purchase. The channel component can support different types of web services for off-site buying experiences (e.g., advertising, cataloguing, mobile marketplaces, or social and messaging channels). The product is displayed at a channel interface based on a product instance of the product, as described herein.

The channel component can generate an order instance 170 for the product. The order instance 170 represents a buyer's intent to purchase the particular SKU of the product. The order instance 170 is generated synchronously with the purchase flow, such that, the order instance can be processed in real-time using the distributed commerce platform. The channel component can generate the order instance with the order object having order object attributes (e.g., SKU, shipping, tax). The order object attributes can be defined as primitives in an API. The order object attributes can be processed based on a configuration of a particular merchant account supported at least in part via the orders component 114, which is responsible for orders processing on the platform component 110. For example, a merchant can configure their merchant account for shipping plan and tax, so that, the order component 114 automatically adds shipping costs and tax costs to the cost of the order. In embodiments, a merchant account can define an alternative shipping plan, where the distributed commerce platform communicates the order instance 172 in real-time during the purchase flow to the merchant platform 130C (e.g., shipping and tax component 134C). The order instance, upon order object attributes being processed, can define an updated order instance (not shown) that is communicated from the platform component 100 to a corresponding channel component to receive buyer information to complete the checkout flow. The channel component cause display of the order instance and attributes so the user can complete a checkout flow (i.e., paying for the order) in order to complete the transaction.

The platform component 110 is responsible maintaining order statuses. It is contemplated that an order status can be generated and updated via a component where the order status change occurred; however, the platform component 110 can also be configured to receive a notification of an order status change and update a centrally managed orders status tracker. An order status can be implemented as an attribute of the order object where an order status includes one of the following—

Created: The buyer has expressed intent to purchase something, but no payment has been made to complete the purchase;

Paid: The order has been successfully paid for, and can be fulfilled. Orders are marked as paid by paying an order;

Canceled: This order may or may not have been paid already, but the merchant (or the customer) has requested a cancellation. If the order has a payment associated with it already, it should be refunded before the order can be marked as canceled. Canceled is a pre-fulfilled state. In other words, only orders that are in states created or paid can be marked as canceled;

Fulfilled: This order was paid for, and has been fulfilled by the merchant (shipped or otherwise). Only orders that are in the paid state can be marked as fulfilled;

Returned: The order was paid for, goods were delivered, and then returned. To mark an order to returned, you have to ensure that any payment associated with this order has been refunded. Returned is a strictly post-fulfilled state. In other words, only orders in the fulfilled state can be marked as returned.

In addition, acceptable state transitions for an Order can include: From created to paid or canceled; From paid to canceled (requires that the underlying payment is refunded) or fulfilled; and From fulfilled to returned (requires that the underlying payment is refunded). Other variations and combination of order statuses and acceptable transitions are contemplated with embodiments of described herein.

The buyer can complete the checkout flow and pay the order using the platform component (e.g., payment component 116) to complete the transaction. The payment component 116 is responsible for processing payments where the merchant configures the platform component 110 to process payment based on several different payment schemes. The distributed commerce platform via the payment component 116 can support integration with several different payment schemes and corresponding payments systems associated with the payment schemes. In exemplary embodiments, the distributed commerce platform can support (1) a platform payment scheme; (2) a merchant platform payment scheme; (3) a third-party processor platform payment scheme. It is contemplated that the different payment schemes can include specific operational details; nonetheless, embodiments described herein can communicate payment information (e.g., credit card details) between different types of systems. In particular, APIs may be used to define payment objects that facilitate communicating operation details in the payment objects to disparate payment platform components for processing.

Figure 3B:
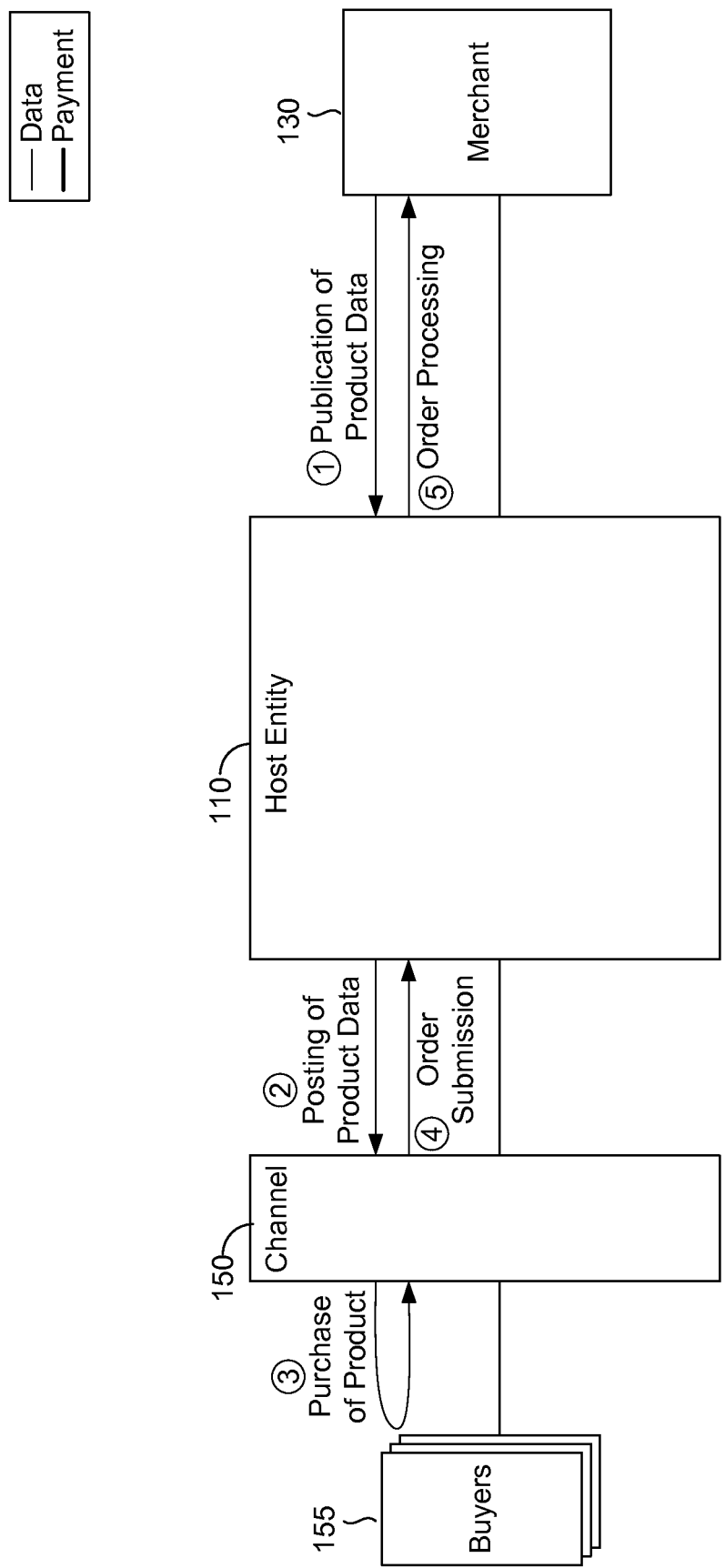

With reference to FIG. 3B, a merchant 130, at step 1, communicates product objects to the host entity 110 for publication of product data. At step 2, the host entity posts the product data based on the merchant identifying the channel 150 to publish the product data to. At step 3, one or more buyers 155 select a product at the channel 150 to purchase the product. At step 4, the channel 150 generates an order object in an order submission. The host entity can receive the order submission and at step 5, the host entity forwards the order for processing at the merchant 130. As discussed herein, order processing can include communicating an updated order object to the channel 150 to receive payment for the product including additional order attributes (e.g., shipping and tax).

Figure 3C:
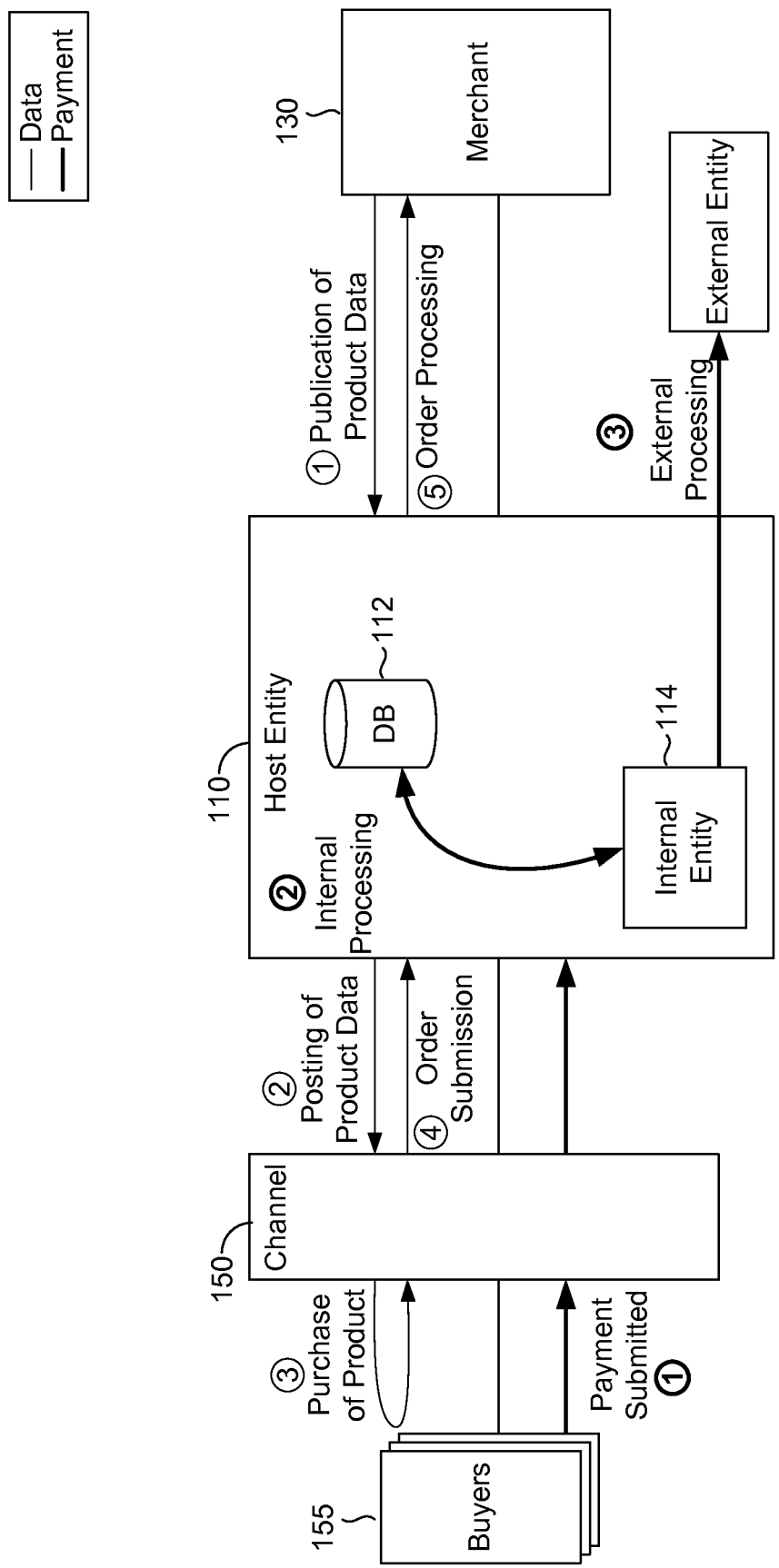

Turning to FIG. 3C, at step 1, a buyer from the one or more buyers 155 submits payment information (e.g., credit card details) at the channel 150. The channel communicates the payment information to the host entity. The host entity can reference a merchant configuration for payment processing for processing the payment. In operation, the merchant may configure the payment configuration as a platform payment scheme. In the platform payment scheme, at step 2, payment is processed internally at the host entity. For example, the host entity can implement internal systems (e.g., database DB 112 and internal entity 114) for processing payment. The host entity 110 may also communicate at step 3 with an external entity associated with the host entity for processing payment.

Figure 3D:
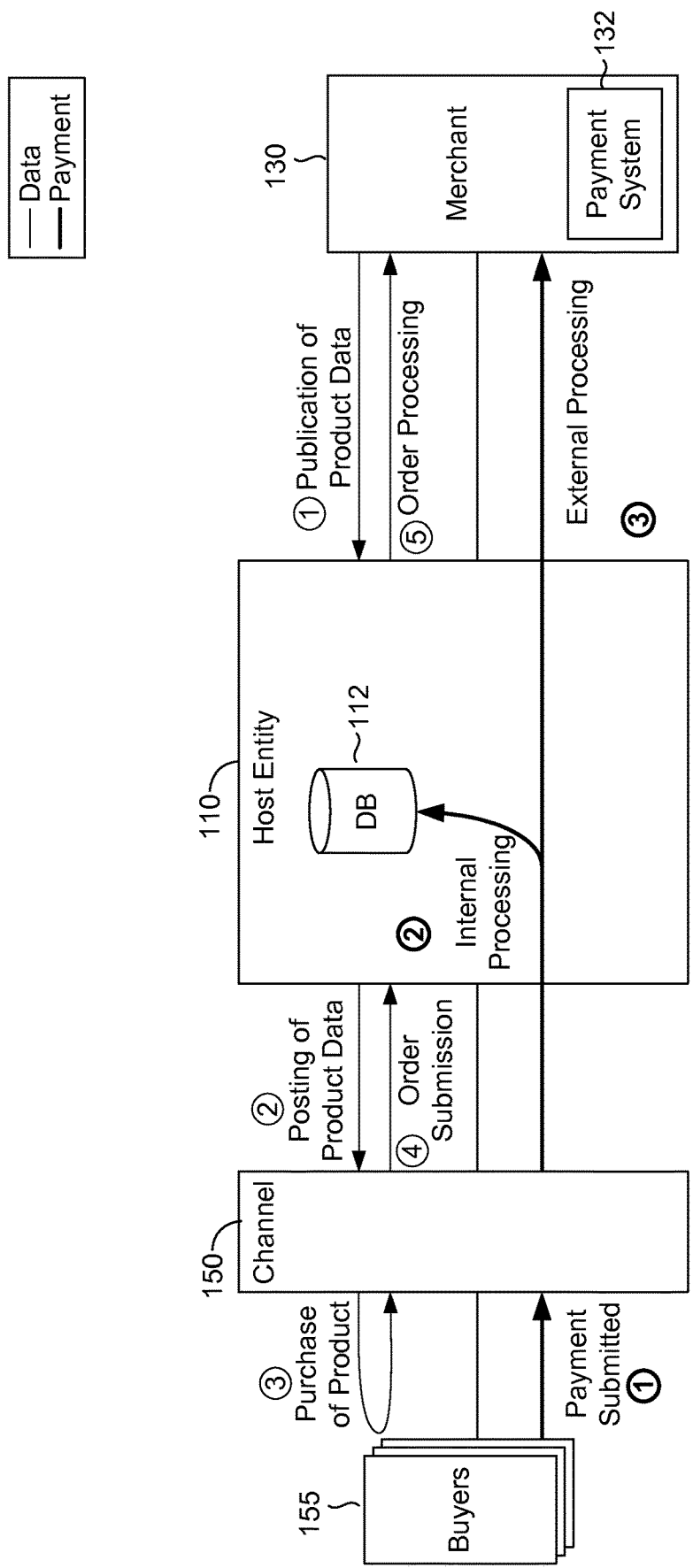

Turning to FIG. 3D, the merchant may configure the payment configuration as a merchant platform payment scheme. It is contemplated that, at step 2, the host entity may further perform additional internal processing using an internal entity (e.g., database DB 112). The payment information can be stored in the DB 112 which is managed directly by host entity 110. Nonetheless, the merchant platform payment scheme involves, at step 3, performing external processing using a payment system of the merchant. In this regard, the channel communicates the payment details to the host entity, and the host entity communicates the payment information to the merchant platform. It is contemplated that communicating payment information may be based on APIs comprising payment objects. The payment objects having the payment details are retrieved at the merchant platform and compatible with the payment systems (e.g., credit cards, online payment systems, specialized payment systems) in the merchant platform. The merchant platform may be required to meet minimum data security standards in order to receive the payment information. For example, a payment system on the merchant platform may have to be certified for Payment Card Industry (PCI) level 1 standards in order to receive payment details. The payment details can be stored on the merchant payment systems which may be managed directly by the merchant or a contracting payment system provider for the merchant.

Figure 3E:
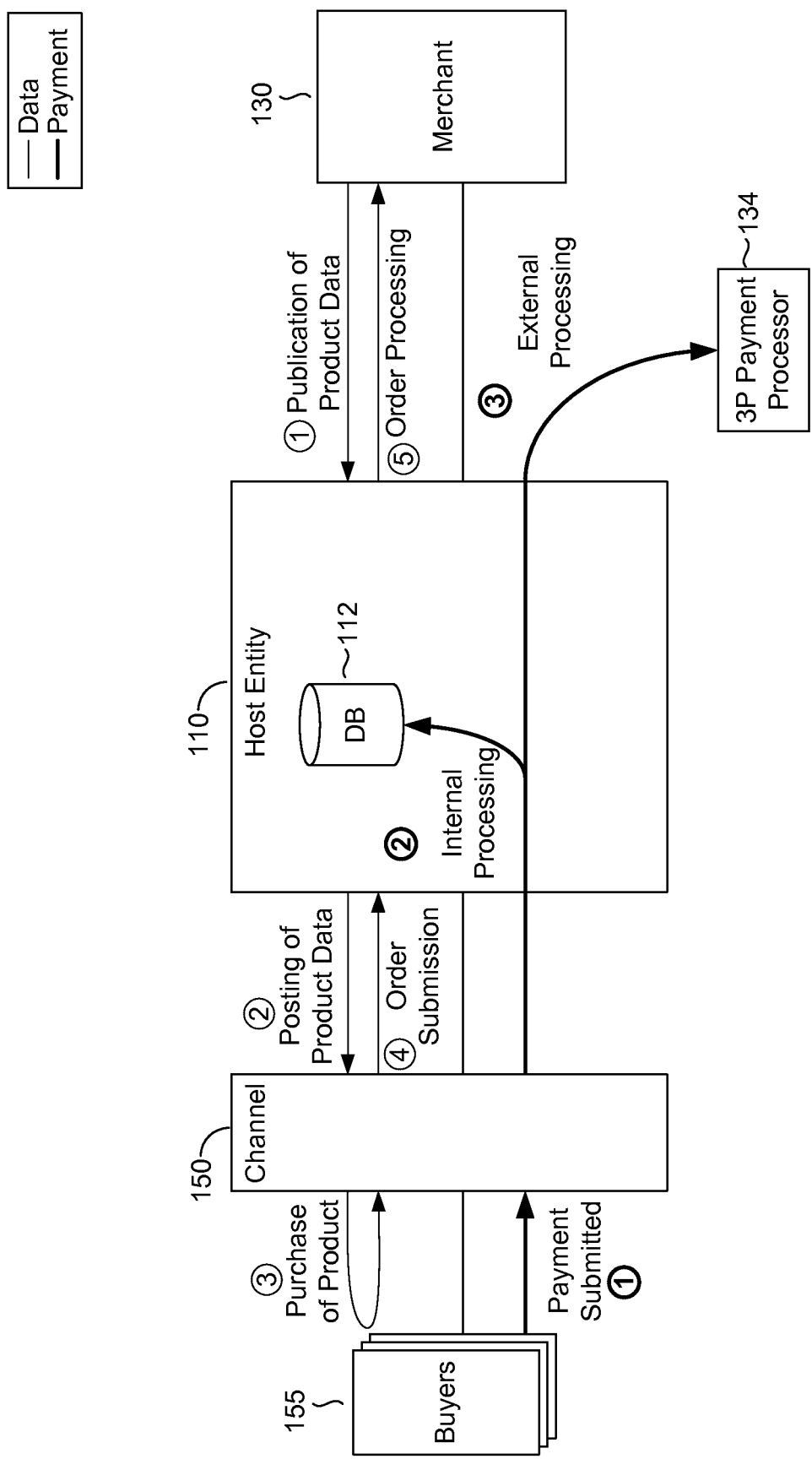

Turning to FIG. 3E, the merchant may configure the payment configuration as a third-party payment processor platform scheme. In this payment scheme, even though the order object (i.e., the order details) are communicated to the merchant, at step 3 the payment information is provided to a third-party payment processor 134 associated with the merchant for processing merchant payments. The third-party payment processor 134 can also be required to meet minimum data security standards in order to receive the payment information. Accordingly, the merchant may configure different variations and combinations of payment schemes corresponding to payment systems that are supported via the host entity 110 for processing payment.

Figures 4, 5:
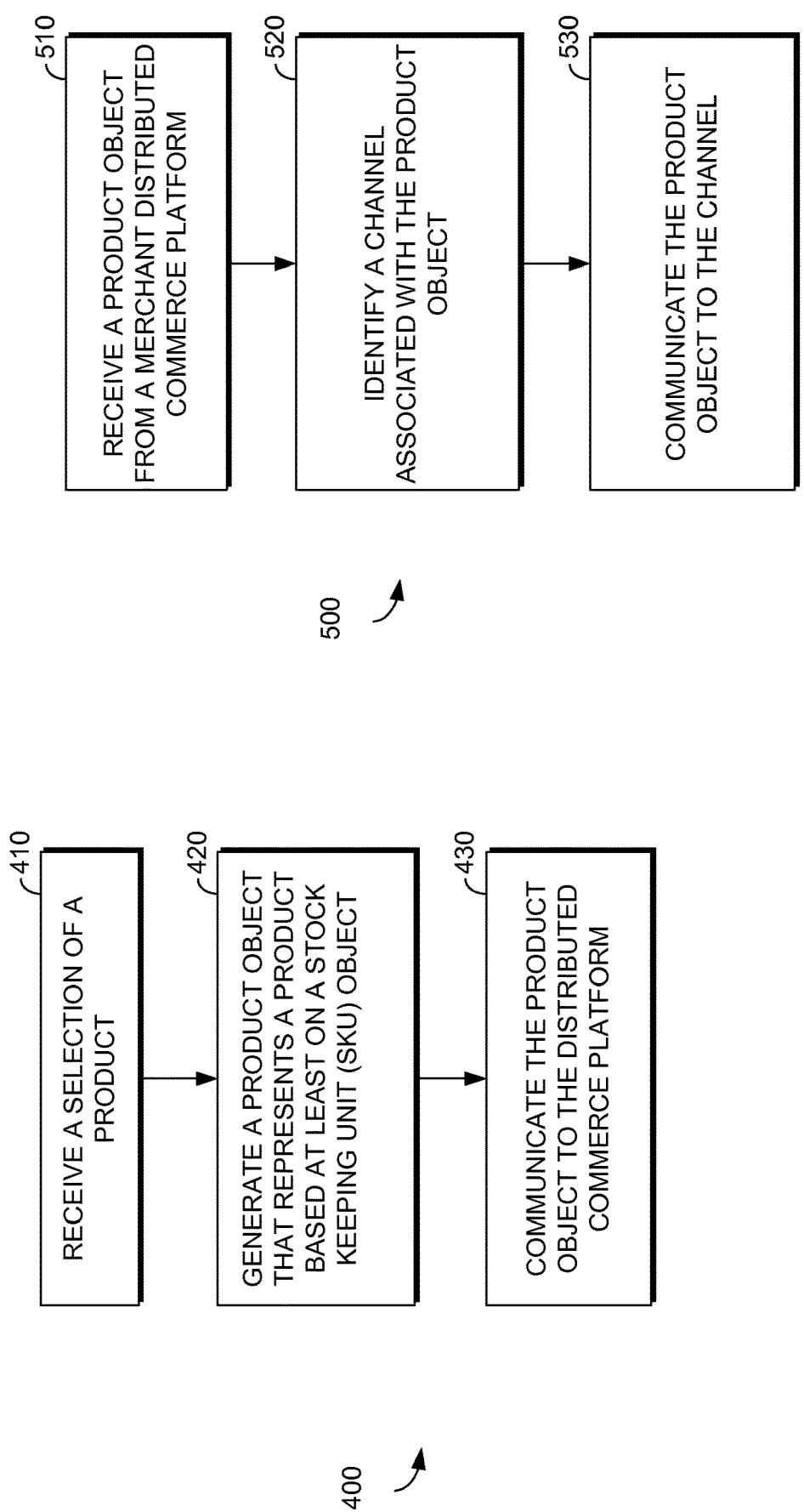
FIG. 4 is a flow diagram showing an exemplary method for order management and processing using a distributed commerce platform, in accordance with embodiments described herein.
FIG. 5 is a flow diagram showing an exemplary method for order management and processing using a distributed commerce platform, in accordance with embodiments described herein.

Turning now to FIG. 4, a flow diagram is provided that illustrates a method 400 for order management and processing using a distributed commerce platform. Initially at block 410, a selection of a product is received at a merchant distributed commerce platform. At block 420, a product object is generated. The product object represents the product based at least on the SKU object. At block 430, the product object is communicated from the merchant distributed commerce platform to a distributed commerce platform.

Turning to FIG. 5, a flow diagram is provided that illustrates a method 500 for order management and processing using a distributed commerce platform. At block 510, a product object is received from a merchant distributed commerce platform. The distributed commerce platform concurrently receives a plurality of product objects from a plurality of merchants. A merchant of the plurality of merchants provides an inventory of products having SKUs that identify variations of the product based at least in part on the product object and the SKU object APIs. The product object and the SKU object each include a plurality of attributes that are identified for a product that is defined in the product object. At block 520, a channel associated with the product object is identified. The channel is one of a plurality of channels associated with the distributed commerce platform. At block 530, the product object is communicated to the channel. Communicating the product instance can include integrating the product object into channel interfaces using API-based request and response structured messages. The product object is concurrently accessible through the plurality of channels, such that, an order based on the product object from any of the plurality of channels updates an inventory of the merchant distributed commerce platform.

Figure 6:
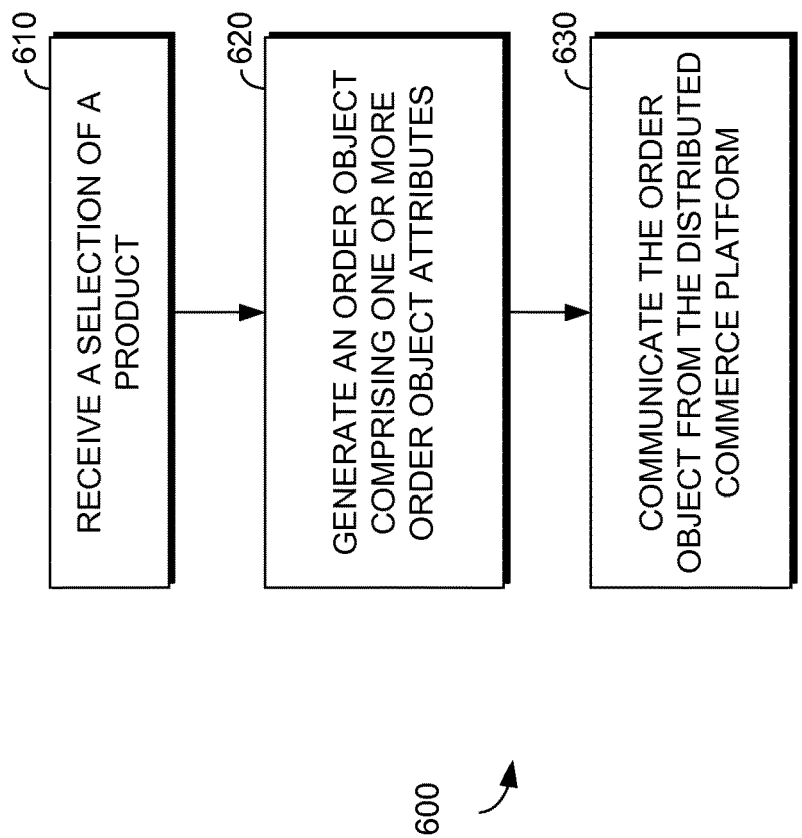
FIG. 6 is a flow diagram showing an exemplary method for order management and processing using a distributed commerce platform, in accordance with embodiments described herein.

Turning now to FIG. 6, a flow diagram is provided that illustrates a method 600 for order management and processing using a distributed commerce platform. Initially at block 610, a selection of a product is received at a channel distributed commerce platform component. At block 620, an order object is generated. The order object represents buyer intent to purchase the product. The order object comprises one or more order object attributes. At block 630, the order object is communicated from the channel to the distributed commerce platform.

Figure 7:
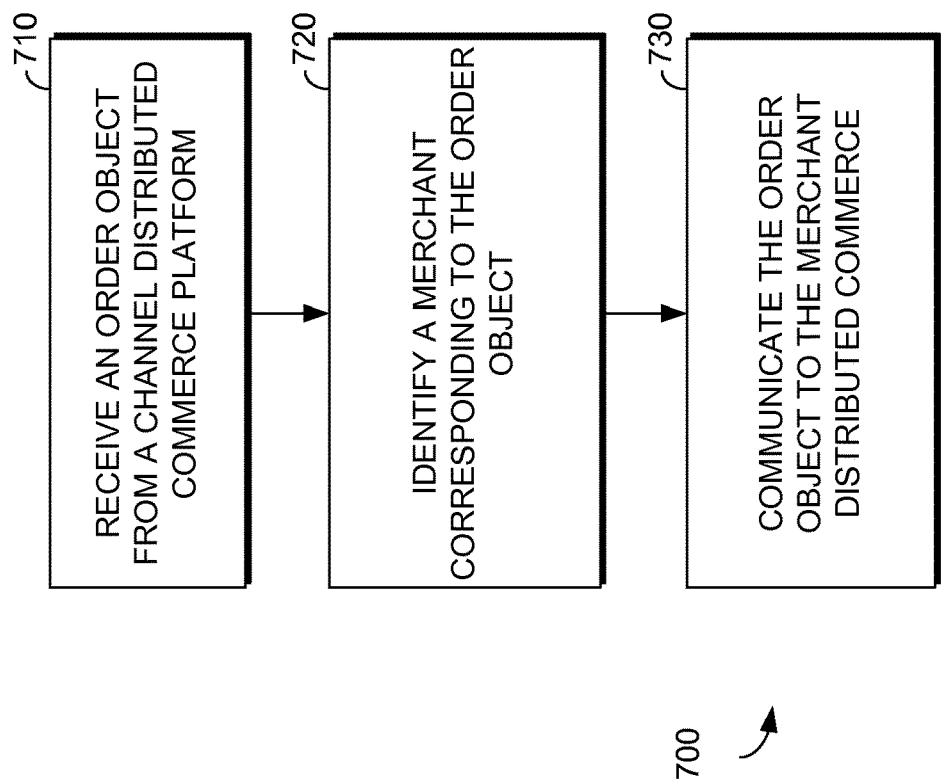
FIG. 7 is a flow diagram showing an exemplary method for order management and processing using a distributed commerce platform, in accordance with embodiments described herein.

Turning to FIG. 7, a flow diagram is provided that illustrates a method 700 for order management and processing using a distributed commerce platform. At block 710, an order object is received from a channel. The order object is associated with an order status attribute (e.g., a discount, a shipping attribute or a tax attribute) that is communicated between the channel and the merchant via the distributed commerce platform. The order status attribute is updated based on processing of the order object. At block 720, a merchant corresponding to the order object is identified. The merchant is one of a plurality of merchants associated with the distributed commerce platform. At block 730, the order object is communicated to the merchant. Processing the order object can further include identifying, in the distributed commerce platform, one or more order object attribute configurations for the merchant corresponding to the order object. Processing the one or more order object attributes based on the one or more order object attribute configurations (e.g., communicating real-time information between the channel distributed commerce platform component and the merchant distributed commerce platform component for dynamic calculations associated with the one or more order object attributes) and communicating an updated order object. Upon receiving the updated order object, a payment object for the updated order object can be received and processed based on a payment object configuration of the merchant. The payment object configuration is defined at the distributed commerce platform component. For example, the payment object configuration can define a native payment system or a non-native payment system.

Having briefly described an overview of embodiments of the present invention, an exemplary operating environment in which embodiments of the present invention may be implemented is described below in order to provide a general context for various aspects of the present invention. Referring initially to FIG. 8 in particular, an exemplary operating environment for implementing embodiments of the present invention is shown and designated generally as computing device 800. Computing device 800 is but one example of a suitable computing environment and is not intended to suggest any limitation as to the scope of use or functionality of the invention. Neither should the computing device 800 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 8, computing device 800 includes a bus 810 that directly or indirectly couples the following devices: memory 812, one or more processors 814, one or more presentation components 816, input/output ports 818, input/output components 820, and an illustrative power supply 822. Bus 810 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 8 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Accordingly, in a first embodiment described herein, a computer-implemented method for order management and processing based on a distributed commerce platform is provided. The method includes receiving, at a distributed commerce platform, a product object from a merchant distributed commerce platform. The method also includes identifying a channel corresponding to the product object, where the channel is one of a plurality of channels associated with the distributed commerce platform. The method further includes communicating the product object to the channel.

In a second embodiment described herein, one or more computer storage media having computer-executable instructions embodied thereon that, when executed, by one or more processors, causes the one or more processors to perform a method for order management and processing based on a distributed commerce platform, is provided. The method includes receiving, at a distributed commerce platform, an order object from a channel distributed commerce platform, the order object is processed at the channel distributed commerce platform, the order object comprises a product identified based on a product object. The method includes identifying a merchant having a merchant distributed commerce platform corresponding to the order object, the merchant is one of a plurality of merchants associated with the distributed commerce platform. The method further includes communicating the order object to the merchant distributed commerce platform.

In a third embodiment described herein, a system for order management and processing based on distributed commerce platform components is provided. The system includes a merchant distributed commerce platform component configured for: receiving a selection of a product; generating a product object, the product object represents the product based at least on the product and a stock keeping unit (SKU) object; and communicating the product object from the merchant distributed commerce platform component.

The system further includes a channel distributed commerce platform component configured for: receiving a selection of the product, wherein the product is selected based on the product object; generating an order object, wherein the order object represents a buyer intent to purchase the product, the order object comprises one or more order object attributes; and communicating the order object from the channel distributed commerce platform component.

The system also includes a distributed commerce platform component configured for: receiving, at the product object from the merchant distributed commerce platform; receiving an identification of one or more channels to publish the product based on the product object; identifying a channel associated with the product object to publish the product, the channel is one of a plurality of channels associated with the distributed commerce platform; communicating the product object to the channel; receiving the order object from the channel distributed commerce platform component; identifying a merchant having the merchant distributed commerce platform component corresponding to the order object, the merchant is one of a plurality of merchants associated with the distributed commerce platform component; and communicating the order object to the merchant distributed commerce platform component.

For purposes of this disclosure, the word "including" has the same broad meaning as the word "comprising," and the word "accessing" comprises "receiving," "referencing," or "retrieving." In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion below, embodiments are described with reference to distributed computing devices and components of a distributed commerce platform system. Components can be configured for performing novel aspects of embodiments, where configured for comprises programmed to perform particular tasks or implement particular abstract data types using code. It is contemplated that the methods described herein can be performed in different types of operating environments having alternate configurations of the functional components described herein. As such, the embodiments described herein are merely exemplary, and it is contemplated that the techniques may be extended to other implementation contexts.

Embodiments presented herein have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

The invention claimed is:

1. A computer-implemented method for order management and processing by a distributed commerce platform, the method comprising:

receiving, at the distributed commerce platform, an instance of a product object from a merchant system for a product sold by the merchant system, wherein the instance of the product object comprises a structured abstraction of product data defined at least in part by a stock keeping unit (SKU) associated with the product;

generating, by the distributed commerce platform, links that embed the instance of the product object and resolve at the distributed commerce platform, wherein each link is configured for a web service and an interface provided by a channel system that presents the product to end users of the channel system;

identifying two or more channel systems for distributing the product object, wherein each channel system is one of a plurality of channel systems associated with the distributed commerce platform, and wherein the two or more identified channel systems are different services that provide different interfaces to end users associated with the two or more identified channel systems;

publishing the instance of the product object to the two or more channel systems using two or more links that correspond to the two or more of the identified channel systems;

receiving an instance of an order object generated in response to an end user of a first channel system selecting a first link to the instance of the product object to initiate a transaction for the product, wherein the order object is a structured abstraction of an intent to purchase the product by the end user, wherein the order object is defined at least in part based on the SKU associated with the product and one or more order object attributes that configure purchase parameters for the product;

identifying, by the distributed commerce platform during the transaction, one or more merchant configurations comprising at least one webhook endpoint of the merchant system and one or more order object attribute configurations comprising: at least one order object attribute configuration defined by the merchant system prior to distribution of the product object and at least one order object attribute obtained by the distributed commerce platform from the merchant system in real time by sending one or more messages to the merchant system via the webhook endpoint, wherein the one or more messages are sent in response to receipt by the commerce platform of one or more user selected order object attribute configurations received from the first channel system that further configure the identified one or more order object attribute configurations and the one or more messages cause the merchant system to determine the at least one order object attribute identified and obtained by the distributed commerce platform during the transaction;

communicating, by the distributed commerce platform to the first channel system during the transaction, an update to the order object, wherein a display of the order object at the first channel system is updated based at least in part on the one or more user selected order object attribute configurations; and processing a payment received from the end user of the first channel system for the instance of the order object to complete the transaction for the purchase of the product from the merchant, and in response to the processing, the commerce platform sending one or more second messages to the merchant system via the webhook endpoint indicative of payment by the end user of the first channel system to cause the merchant system to execute fulfillment of the product.

2. The method of claim 1, wherein the product object is generated at the merchant system before receipt of the product object by the distributed commerce platform, the product object comprises one or more SKU objects associated with configuration options of the product.

3. The method of claim 2, wherein the instance of the product object received at the distributed commerce platform is generated by the merchant system, and wherein generation of the instance of the product object by the merchant system further comprises:

receiving, by the merchant system, a selection of a product;

generating the instance of the product object, wherein the instance of the product object represents the product based at least on the SKU object; and communicating the product object from the merchant system to the distributed commerce platform.

4. The method of claim 2, wherein the distributed commerce platform concurrently receives a plurality of product objects from a plurality of merchant systems, wherein a first merchant system of the plurality of merchant systems provides an inventory of products having SKUs that identify variations of the product.

5. The method of claim 2, wherein the product object and the SKU object each comprise a plurality of attributes that are identified for a product that is defined in the product object.

6. The method of claim 1, wherein publishing the product object to the two or more channel systems further comprises:

integrating one or more of the links generated for the instance of the product object into interfaces of each of the two or more channels based on API-based request and response structured messages.

7. The method of claim 1, wherein the product object is concurrently accessible through the plurality of channel systems via the generated links such that an order based on the product object from any of the plurality of channels updates a product inventory maintained by the merchant.

8. The method of claim 1, wherein the instance of the order object is associated with an order status attribute that is communicated between the channel system and the merchant system via the distributed commerce platform, wherein the order status attribute is updated based on processing of the order object.

9. The method of claim 1, wherein processing the instance of the order object for completion of the transaction for the purchase of the product comprises:

receiving a selection of the product, wherein the product is selected based on selection of the first link by the end user of the first channel system in content provided by the first channel system, and wherein the selected first link is to the product object at the distributed commerce platform; and receiving the instance of the order object, wherein the instance of the order object comprises one or more order object attributes selected by the end user of the first channel system on an interface provided by the first channel system.

10. The method of claim 1, wherein the one or more order object attribute that configure purchase parameters for the product includes at least one from the following: a discount attribute, shipping attribute, and a tax attribute.

11. The method of claim 1, further comprising:

receiving, at the distributed commerce platform from the first channel system, a payment object for the updated order object; and processing the payment object based on a payment object configuration of the merchant system defined at the distributed commerce platform.

12. The method of claim 11, wherein the payment object configuration defines a native payment system or a non-native payment system.

13. The method of claim 11, wherein the payment object configuration of the payment object is one of:

(1) a distributed commerce platform payment scheme;
(2) a merchant platform payment scheme; and
(3) a third-party processor platform payment scheme.

14. A non-transitory computer readable storage medium including instructions that, when executed by a processor, cause the processor to perform a method for a distributed commerce platform managing and processing a transaction, the method comprising:

receiving, at the distributed commerce platform, an instance of a product object from a merchant system for a product sold by the merchant system, wherein the instance of the product object comprises a structured abstraction of product data defined at least in part by a stock keeping unit (SKU) associated with the product;

generating, by the distributed commerce platform, links that embed the instance of the product object and resolve at the distributed commerce platform, wherein each link is configured for a web service and an interface provided by a channel system that presents the product to end users of the channel system;

identifying two or more channel systems for distributing the product object, wherein each channel system is one of a plurality of channel systems associated with the distributed commerce platform, and wherein the two or more identified channel systems are different services that provide different interfaces to end users associated with the two or more identified channel systems;

publishing the instance of the product object to the two or more channel systems using two or more links that correspond to the two or more of the identified channel systems;

receiving an instance of an order object generated in response to an end user of a first channel system selecting a first link to the instance of the product object to initiate a transaction for the product, wherein the order object is a structured abstraction of an intent to purchase the product by the end user, wherein the order object is defined at least in part based on the SKU associated with the product and one or more order object attributes that configure purchase parameters for the product;

identifying, by the distributed commerce platform during the transaction, one or more merchant configurations comprising at least one webhook endpoint of the merchant system and one or more order object attribute configurations comprising: at least one order object attribute configuration defined by the merchant system prior to distribution of the product object and at least one order object attribute obtained by the distributed commerce platform from the merchant system in real time by sending one or more messages to the merchant system via the webhook endpoint, wherein the one or more messages are sent in response to receipt by the commerce platform of one or more user selected order object attribute configurations received from the first channel system that further configure the identified one or more order object attribute configurations and the one or more messages cause the merchant system to determine the at least one order object attribute identified and obtained by the distributed commerce platform during the transaction;

communicating, by the distributed commerce platform to the first channel system during the transaction, an update to the order object, wherein a display of the order object at the first channel system is updated based at least in part on the one or more user selected order object attribute configurations; and processing a payment received from the end user of the first channel system for the instance of the order object to complete the transaction for the purchase of the product from the merchant, and in response to the processing, the commerce platform sending one or more second messages to the merchant system via the webhook endpoint indicative of payment by the end user of the first channel system to cause the merchant system to execute fulfillment of the product.

15. A system for a distributed commerce platform processing and managing a transaction, the system comprising:
an interface, of the distributed commerce platform, to receive an instance of a product object from a merchant system for a product sold by the merchant system, wherein the instance of the product object comprises a structured abstraction of product data defined at least in part by a stock keeping unit (SKU) associated with the product;
a memory to store the product data associated with the instance of the product object;
a processor coupled with the memory and the interface configured to:
generate links that embed the instance of the product object and resolve at the distributed commerce platform, wherein each link is configured for a web service and an interface provided by a channel system that presents the product to end users of the channel system,
identify two or more channel systems for distributing the product object, wherein each channel system is one of a plurality of channel systems associated with the distributed commerce platform, and wherein the two or more identified channel systems are different services that provide different interfaces to end users associated with the two or more identified channel systems,
publish the instance of the product object to the two or more channel systems using two or more links that correspond to the two or more of the identified channel systems,
receive an instance of an order object generated in response to an end user of a first channel system selecting a first link to the instance of the product object to initiate a transaction for the product, wherein the order object is a structured abstraction of an intent to purchase the product by the end user, wherein the order object is defined at least in part based on the SKU associated with the product and one or more order object attributes that configure purchase parameters for the product,
identify, during the transaction, one or more merchant configurations comprising at least one webhook endpoint of the merchant system and one or more order object attribute configurations comprising: at least one order object attribute configuration defined by the merchant system prior to distribution of the product object and at least one order object attribute obtained by the distributed commerce platform from the merchant system in real time by sending one or more messages to the merchant system via the webhook endpoint, wherein the one or more messages are sent in response to receipt by the commerce platform of one or more user selected order object attribute configurations received from the first channel system that further configure the identified one or more order object attribute configurations and the one or more messages cause the merchant system to determine the at least one order object attribute identified and obtained by the distributed commerce platform during the transaction,
communicate, to the first channel system during the transaction, an update to the order object, wherein a display of the order object at the first channel system is updated based at least in part on the one or more user selected order object attribute configurations, and
process a payment received from the end user of the first channel system for the instance of the order object to complete the transaction for the purchase of the product from the merchant, and in response to the processing, the commerce platform sending one or more second messages to the merchant system via the webhook endpoint indicative of payment by the end user of the first channel system to cause the merchant system to execute fulfillment of the product.

* * * * *